United States Patent [19]

Haglund et al.

[11] Patent Number: 4,543,677
[45] Date of Patent: Oct. 1, 1985

[54] AIRTIGHT TELESCOPING RIGID CONDUIT

[75] Inventors: Richard A. Haglund, Hawthorne; Robert E. Tupack, Hermosa Beach, both of Calif.

[73] Assignee: Teledyne Industries, Inc., Los Angeles, Calif.

[21] Appl. No.: 598,808

[22] Filed: Apr. 9, 1984

[51] Int. Cl.[4] .......................... E01D 1/00; F16L 9/22
[52] U.S. Cl. ..................................... 14/71.5; 138/120; 138/155; 285/302; 277/206 R; 277/207 A; 98/39.1
[58] Field of Search .................... 138/120, 149, 155; 285/31, 302; 277/207 A, 207 R, 205, 206 R; 14/71.5; 98/33 R

[56] References Cited

U.S. PATENT DOCUMENTS

| | | | |
|---|---|---|---|
| 995,453 | 6/1911 | Greenfield | 138/120 X |
| 2,587,810 | 3/1952 | Beyer | 277/206 X |
| 2,764,428 | 9/1956 | Murphy | 285/302 X |
| 2,783,106 | 2/1957 | Barnhart | 277/206 X |
| 2,981,232 | 4/1961 | Peras | 277/205 X |
| 3,217,805 | 11/1965 | Howard | 285/302 X |
| 3,532,367 | 10/1970 | Roos | 285/302 |
| 3,829,104 | 8/1974 | Green | 277/205 X |
| 3,976,130 | 8/1976 | Chambless et al. | 285/302 X |
| 4,270,761 | 6/1981 | Hertz | 277/205 X |
| 4,357,860 | 11/1982 | Krzak | 138/120 X |

FOREIGN PATENT DOCUMENTS

| | | | |
|---|---|---|---|
| 1258351 | 3/1961 | France | 277/207 A |
| 590267 | 4/1959 | Italy | 277/207 R |

Primary Examiner—James E. Bryant, III
Attorney, Agent, or Firm—Reagin & King

[57] ABSTRACT

An airtight telescoping rigid conduit is disclosed which includes rigid tubular sections which are coupled together using multiple bearings and a pressure actuated resilient seal ring. The tubular sections are constructed with a heat insulating foam core to minimize losses to, or gains from, the atmosphere. The conduit is designed to be attached to a telescoping passenger loading bridge which connects an airport terminal to an aircraft. The conduit provides preconditioned cooling or heating air from the terminal to the aircraft.

4 Claims, 3 Drawing Figures

AIRTIGHT TELESCOPING RIGID CONDUIT

BACKGROUND OF THE INVENTION

This invention relates to telescoping conduit and, more particularly, to airtight telescoping rigid conduit attached to an extendable passenger loading bridge, for conveying cabin conditioning air to a parked aircraft.

Over the years, a variety of techniques have been developed for providing ground-based utilities to a parked aircraft. One technique employs portable apparatus which is rolled up to the aircraft, is generally diesel engine powered, and may provide electrical power, high pressure compressed air, or conditioned air to the aircraft. Another technique employs fixed conduit which extends from the airport terminal to a location adjacent the aircraft. The conduit may be used to provide air and electrical power to the aircraft.

Yet another technique for supplying utilities to a parked aircraft employs conduits which are attached to the existing extendable passenger loading bridge used to load and unload passengers. An advantage of this technique is that it utilizes an existing connection system between the terminal building and the aircraft to provide the ground based utilities to the aircraft. An example of this technique is disclosed in U.S. Pat. No. 3,521,316, issued July 21, 1970 to G. J. Adams, et al.

The passenger loading bridge referred to above is of the type having telescoping sections which may be extended and retracted, and which may swing horizontally and pivot vertically. Accordingly, utility conduits attached to the loading bridge must be constructed to accommodate the movments of the bridge. This requirement presents several problems relative to the conditioned air conduit used to provide cabin conditioning air to the aircraft.

Conditioned air is generally provided to the aircraft at very low pressure, on the order of one pound per square inch, and at temperatures different than that of the outside ambient. Conduit used to convey the conditioned air to the aircraft must remain airtight at the low air pressures involved, must be well insulated to prevent temperature loss to, or gain from, ambient, and must present negligible friction and pressure losses through the conduit.

In the past, attempts have been made to employ flexible conduit having an accordian-shaped wall to convey conditioned air along a passenger loading bridge. This type of mechanization is described in the Adams patent referenced above. In practice, this type of conduit produces unacceptably large frictional losses, which increase the amount, and consequently the cost of the power needed to place the air aboard the aircraft.

Prior art designs have also used telescoping tubing having expandable collars which seal adjacent sections of the tubing when high pressure air is applied to the tubing. Because of the high pressures needed to cause the collars to expand, this mechanization is not suitable for low pressure conditioned air. Accordingly, its use has been limited to applications involving high pressure compressed air used for aircraft engine starting and the like, as described in the Adams patent.

Accordingly, it is an object of the present invention to provide new and improved airtight telescoping rigid conduit.

It is another object of the present invention to provide telescoping rigid conduit suitable for conveying conditioned air to an airplane using a telescoping passenger loading bridge.

It is yet another object of the invention to provide telescoping rigid conduit which can accommodate the movements of a telescoping passenger loading bridge, which is airtight at very low air pressure, which presents negligible friction and pressure losses, and which is insulated to prevent temperature loss to, or gain from, the ambient.

SUMMARY OF THE INVENTION

The foregoing and other objects of the invention are accomplished by rigid conduit including first and second sections of rigid tubing. The second section fits within the first section in a telescoping fashion, and the relative diameters of each section are such that an annular space is formed between the outer surface of the second section and the inner surface of the first section.

Three ring-shaped bearings are provided to support one end of the second section which slides into one end of the first section. The first bearing is affixed around the outer surface of the second section adjacent its one end, and the second bearing is also fixed around the outer surface of the second section at a predetermined distance from the first bearing. Both the first and second bearings have a thickness slightly less than the width of the annular space, and have an outer surface sufficiently smooth to slide freely along the inner surface of the first section.

The third bearing is affixed to the inner surface within the first section adjacent its one end, has a thickness slightly less than the width of the annular space, and has an inner surface sufficiently smooth to slide freely along the outer surface of the second section.

A resilient seal is provided in the form of a seal ring having a generally V-shaped cross-section. One leg of the V has an outer surface which forms the inner surface of the seal ring and which is positioned around the outer surface of the second section between the first and second bearings. The width of the one leg of the V is approximately equal to the predetermined distance and the open end of the V is oriented toward the first bearing. The other leg of the V extends into contact with the inner surface of the first section.

Pressurized gas flowing through the first section into the second section is prevented from leaking out of the first section by the V-shaped seal ring, which expands to seal the annular space in response to the force generated by the pressured gas.

Other objects, features and advantages of the invention will become apparent by reference to the specification taken in conjunction with the drawings, in which like elements are referred to by like reference designations throughout the several views.

DESCRIPTION OF THE PREFERRED EMBODIMENT

Figure 1:
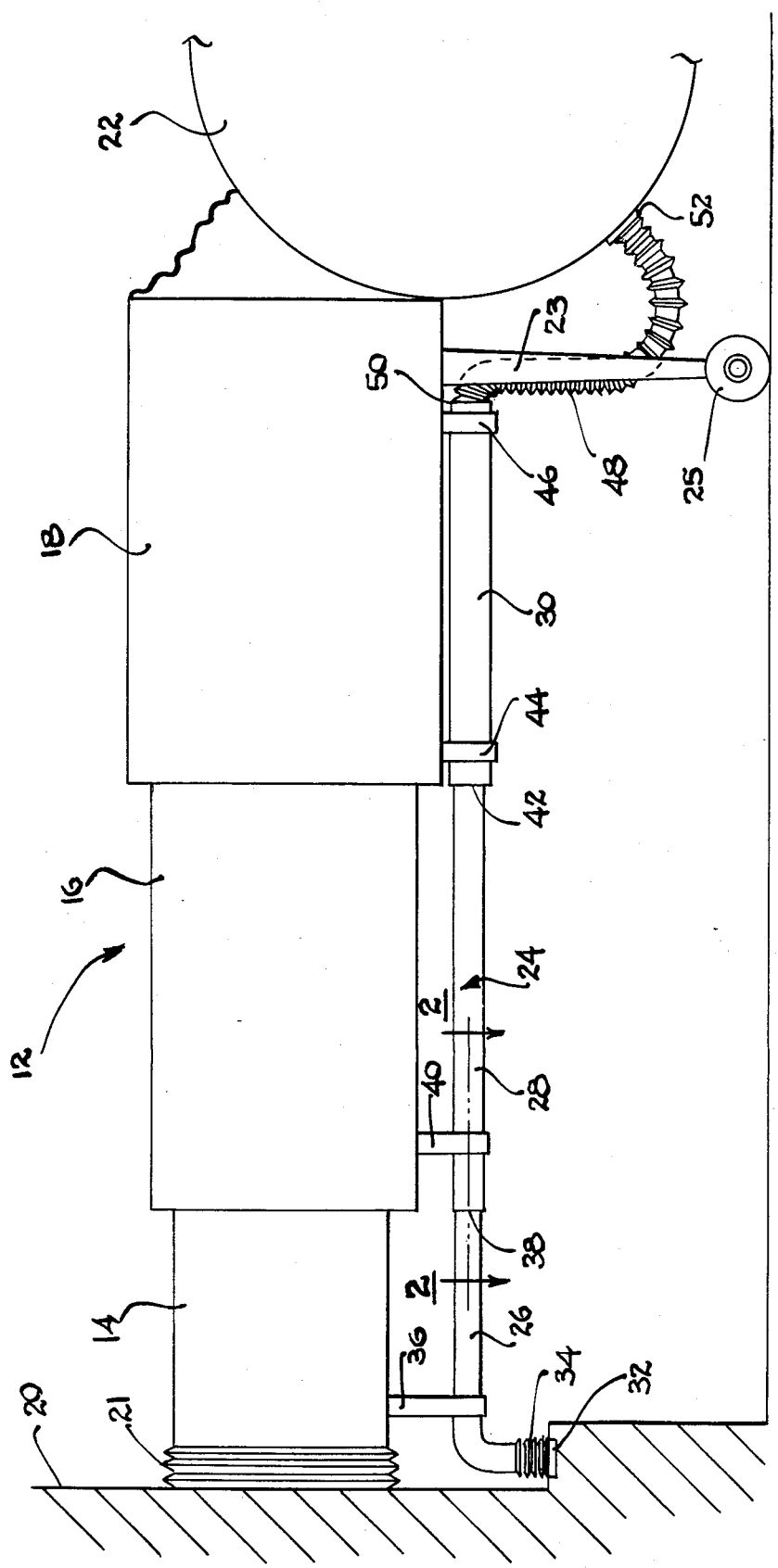
FIG. 1 is a side view of a telescoping passenger loading bridge showing the position of the telescoping rigid conduit of the present invention in its extended position to provide conditioning air from an airport terminal to an aircraft.

FIG. 1 shows a side view of a conventional passenger loading bridge 12 formed of telescoping sections 14, 16, and 18 which are shown in their extended position. One end of the section 14 is attached to an airport terminal building 20 using a flexible coupling 21, and the sections 16 and 18 are extendable so that one end of the section 18 can contact a parked aircraft 22 to form a passenger causeway. A leg 23 which terminates at a wheel 25 provides a rolling support for the bridge 12.

Fastened upon the bridge 2 is an airtight conduit 24 which includes telescoping sections 26, 28, and 20 each of which is in the form of rigid tubing, as described in detail below. One end of the section 26 is attached to a duct 32 provided at the terminal 20. The duct 32 in turn communicates with a source (not shown) of low-pressure pre-conditioned cooling or heating air. A flexible fitting 34 is used to make the connection between the rigid section 26 and the duct 32. A hanger bracket 36, which may be in the form of a strap, is used to support the tubing section 26 below the bridge section 14.

One end 38 of the tubing section 28 fits over the free end of the section 26. The tubing section 28 is supported beneath the bridge section 16 by a hanger bracket 40 which is positioned adjacent the end 38. One end 42 of the tubing section 30 fits over an end of the section 28. The tubing section 30 is supported beneath the bridge section 18 by hanger brackets 44 and 46. A flexible hose 48 connects between an end 50 of the section 30 and a connector 52 provided on the aircraft 22. The connector 52 in turn communicates with the cabin air-conditioning ducts in the aircraft 22.

The conduit 24 described above is designed to accommodate the movements of the passenger bridge 12 while providing an airtight seal between adjacent sections 26, 28, and 30 when the bridge 12 is in its extended position and the conduit 24 is pressurized with lower pressure pre-conditioned air.

Figure 2:
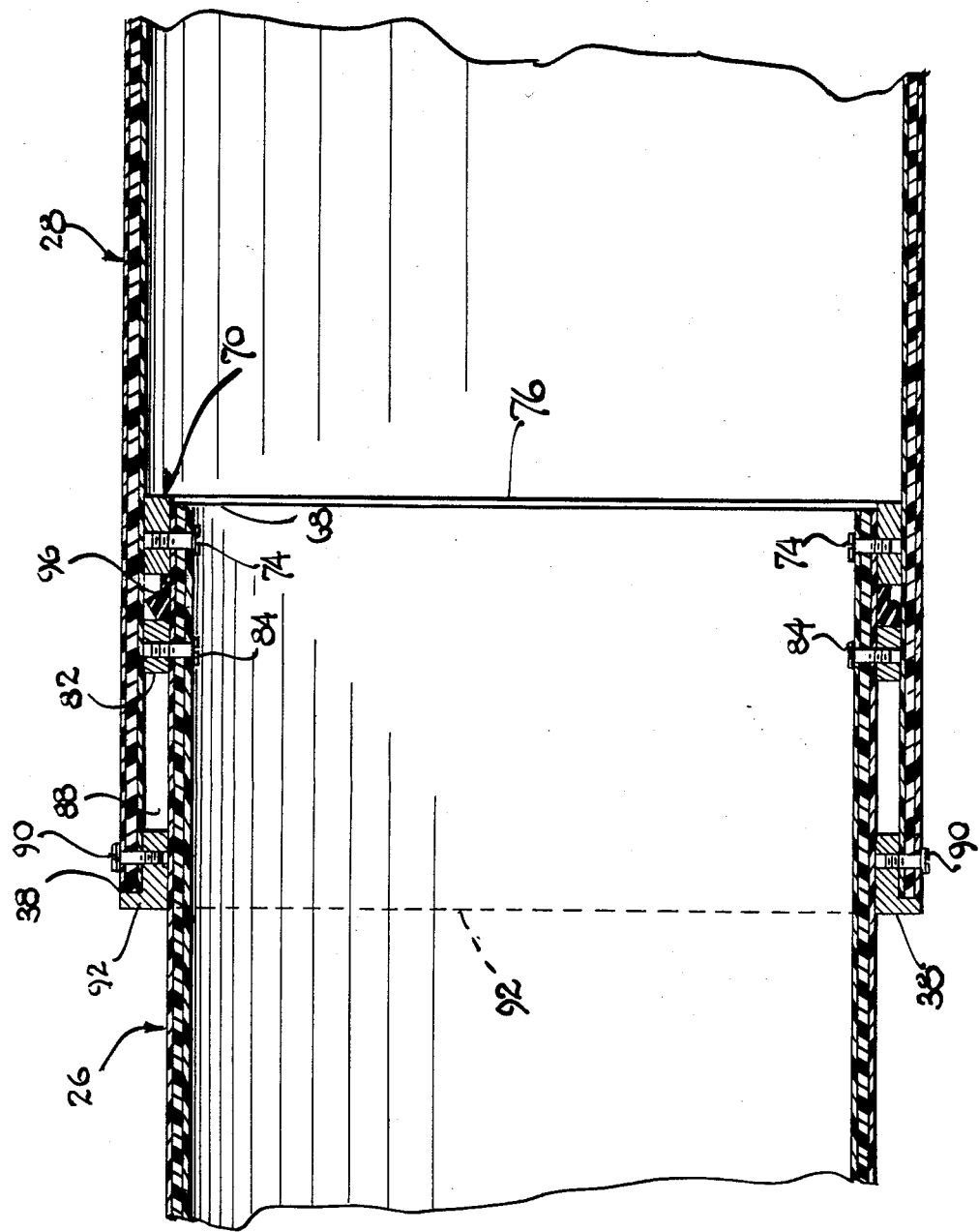
FIG. 2 is an enlarged cross-sectional view of the joint between adjacent sections of the conduit of FIG. 1 taken along the line 2—2 of FIG. 1 and showing the bearings and seal used in the construction of the conduit.
Figure 3:
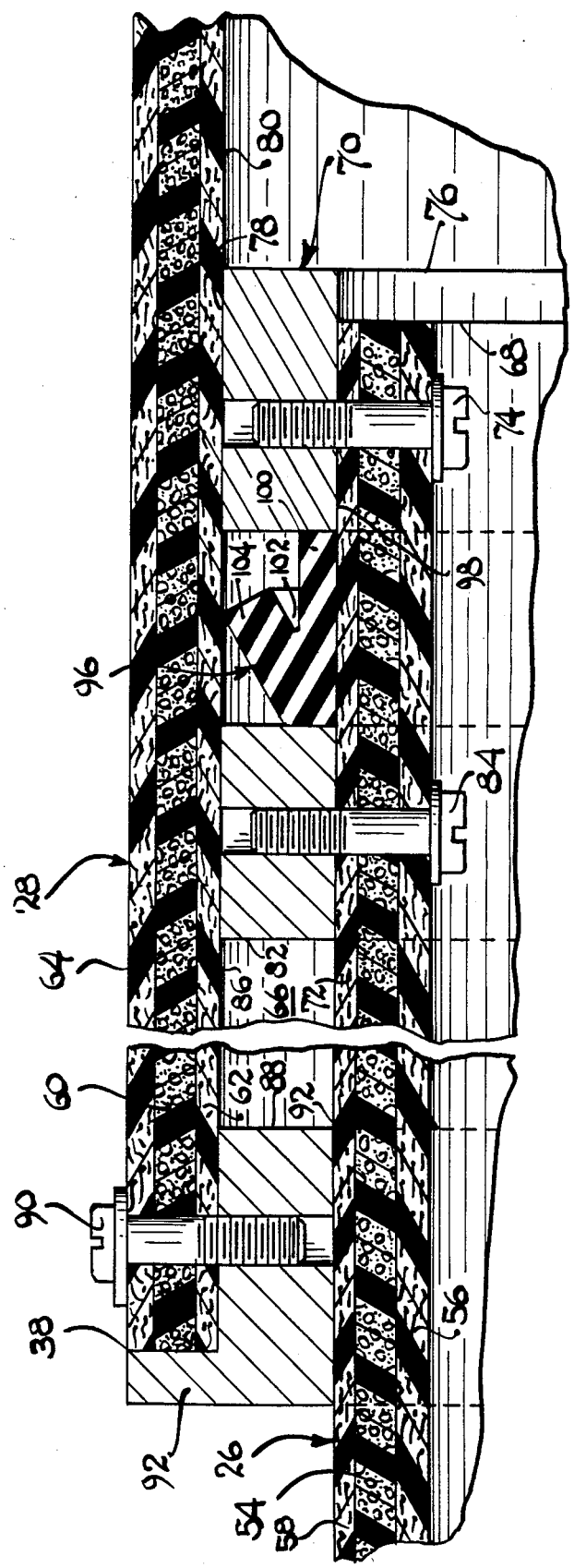
FIG. 3 is a cross-sectional view of a portion 3—3 of FIG. 2 further enlarged to show the details of construction of the seal and bearings of the conduit of FIG. 1.

FIGS. 2 and 3 are enlarged cross-sectional views of the portion of the conduit 24 where the section 2 is coupled to the section 28. Referring to these figures, the wall of the tubular section 26 is formed of a layer of polyurethane foam 54 about one-quarter of an inch in thickness sandwiched between inner and outer layers 56 and 58, respectively, each of which is made of a fiber-reinforced plastic, such as epoxy impregnated fiberglass which is about one-tenth of an inch thick. The tubular section 28 is similarly formed of a layer of polyurethane foam 60 sandwiched between inner and outer layers 62 and 64, respectively, of fiber reinforced plastic. The third section 30 is also constructed in this same manner.

The inner diameter of the section 28 is sufficiently larger than the outer diameter of the section 26 so that an annular space 66 approximately one-half inch in width is formed when one end 68 of the section 26 is inserted into the section 28. A first bearing 70 in the shape of a ring is fastened around outer surface 72 of the section 26 at the one end 68 and is held to the section 26 using screws 74. The bearing 70 includes a lip 76 which extends over the end 68. The width of the bearing 70 is about one inch, and its thickness is slightly less than the width of the annular space 66, to allow for a small amount of play between outer surface 78 of the bearing 70 and inner surface 80 of the section 28. The bearing 70 may be formed of any of a number of hard plastic materials such as Teflon, and the surface 78 is made sufficiently smooth to slide freely along the surface 80.

A second bearing 82 in the shape of a ring is fastened around the outer surface 72 of the section 26 at a predetermined distance of about one inch from the bearing 70. The bearing 82 is held to the section 26 using screws 84. The bearing 82, which may be made of the same material as the bearing 70, is approximately the same thickness as the bearing 70 and has a smooth outer surface 86 which slides freely along the surace 80.

A third bearing 88 is provided which is also in the shape of a ring and is fastened to the inner surface 80 of the section 28 at the one end 38, and is held in place using screws 90. The bearing 88 includes a lip 92 which extends over the end 38. The width of the bearing 88 is about one inch and its thickness is slightly less than the width of the space 66, to allow for a small amount of play between inner surface 94 of the bearing 88 and the outer surface 72 of the section 26. The bearing 88, which may be made of the same material as the bearing 70, has a smooth inner surface 94 which slides freely along the surface 72.

A resilient seal ring 96 is provided which has a generally V-shaped cross section and may be made from a resilient seal material such as Neoprene. Surface 98 of one leg 100 of the ring 96 forms the inner surface of the seal ring 96 which fits tightly around the outer surface 72 of the section 26 in the space between bearings 70 and 82. The width of the leg 100 is approximately equal to the space between bearings 70 and 82, which act to hold the ring 96 in position. Open end 102 of the V-shaped ring 96 is oriented toward the bearing 70, and leg 104 of the ring 96 extends into contact with inner surface 80 of the section 26. The above described construction of the joint between the sections 26 and 28 applies equally to the construction of the joint between the sections 28 and 30.

The operation of the telescoping conduit described above is as follows. Referring to FIG. 1, in the absence of parked aircraft, the bridge 12 is in a contracted position. Under this condition, the sections 26, 28 and 30 of the conduit 24 are telescoped together, one inside the other, the flexible hose 48 is stowed in a compartment provided on the bridge section 18, and no pressurized air flows through the conduit 24.

Upon the arrival of an aircraft, the bridge 12 is extended. As the bridge sections 14, 16 and 18 move apart, the conduit sections 26, 28 and 30 follow suit. Referring to FIG. 3, the sections 26, 28 and 30 move apart smoothly due to the smooth sliding action of the bearings 70, 82 and 88. These bearings maintain the sections 26, 28 and 30 in proper alignment with respect to each other but have sufficient play to enable the conduit 24 to accommodate the mechanical misalignments which commonly occur between adjacent sections of 14, 16, 18 of the bridge 12 as it is being extended.

After the bridge is extended to the aircraft 22, the free end of the hose 48 is coupled to the connector 52, and the conduit is pressurized with pre-conditioned air at a pressure of about one pound per square inch. Referring to FIG. 3, any air attempting to leak out from section 26 of the conduit 24 must flow through the space between the surfaces 78 and 80. At this point, the air exerts a pressure on the resilient seal 96, which, due in part to its shape, is caused to expand and increase contact between the seal 96 and the surfaces 72 and 80. This same analysis applies for air attempting to leak from the joint between sections 28 and 30. In this manner, the conduit 24 provides an airtight seal, even under low pressure conditions, since very little force is required to effect the seal. The foam layers 54, 60 provide a high degree of heat insulation for the walls of the conduit 24 and minimize the heat loss of the conditioning cooling air to, or from, the ambient. The smooth walls of the conduit 24 also minimize the friction heat losses.

When the aircraft is ready to depart, the conduit 24 is depressurized, the hose 48 is disconnected from the connector 52 and stowed, and the bridge 12 is retracted. Depressurizing the conduit 24 relieves the pressure on the seal ring 96 and permits the adjacent sections 26, 28, 30 to slide freely.

While there has been shown and described a preferred embodiment of the invention, it is to be understood that various other adaptations and modifications may be made within the spirit and scope of the invention. For example, while the embodiment described above shows the conduit mounted underneath the bridge, the conduit may also be mounted above or on the side of the bridge. It is thus intended that the invention be limited in scope only by the appended claims.

What is claimed is:

1. Telescoping rigid conduit, comprising:

a first section of rigid tubing;

a scond section of rigid tubing having an outside diameter which is less than the inside diameter of the first section, whereby one end of the second section fits within one end of the first section, forming an annular space between the inner surface of the first section and the outer surface of the second section, where the width of the annular space is one-half the difference between the inside diameter of the first section and the outside diameter of the second section, and where the first and second sections of rigid tubing are each formed of a layer of heat insulating foam sandwiched between two layers of fiber reinforced plastic;

a first bearing in the shape of a first ring which is affixed around the outer surface of the second section adjacent the one end of the second section, in which the thickness of the first ring is slightly less than the width of the annular space, and in which the outer surface of the first ring is sufficiently smooth to slide freely along the inner surface of the first section;

a second bearing in the shape of a second ring which is affixed around the outer surface of the second section at a predetermined distance from the first bearing, in which the thickness of the second ring is slightly less than the width of the annular space, and in which the outer surface of the second ring is sufficiently smooth to slide freely along the inner surface of the first section;

a third bearing in the shape of a third ring which is affixed to the inner surface within the first section adjacent the one end of the first section, in which the thickness of the third ring is slightly less than the width of the annular space, and in which the inner surface of the third ring is sufficiently smooth to slide freely along the outer surface of the second section; and a resilient seal formed in the shape of a seal ring having a generally V-shaped cross-section, where the outside surface of one leg of the V forms the inner surface of the seal ring which is positioned around the outer surface of the second section between the first and second bearings, where the width of the one leg of the V is approximately equal to the predetermined distance, where the open end of the V is oriented toward the first bearing, and where the other leg of the V extends into contact with the inner surface of the first section, whereby pressurized gas flowing through the first section into the second section is prevented from leaking out of the first section by the V-shaped resilient seal ring, which expands to seal the annular space in response to the force generated by the pressurized gas.

2. Telescoping rigid conduit, comprising:

a first section of rigid tubing;

a second section of rigid tubing having an outside diameter which is less than the inside diameter of the first section, whereby one end of the second section fits within one end of the first section, forming an annular space between the inner surface of the first section and the outer surface of the second section, where the width of the annular space is one-half the difference between the inside diameter of the first section and the outside diameter of the second section, and where the first and second sections of rigid tubing are fastened to adjacent sections of a telescoping passenger loading bridge used to connect between an airline terminal and a parked aircraft;

a first bearing in the shape of a first ring which is affixed around the outer surface of the second section adjacent the one end of the second section, in which the thickness of the first ring is slightly less than the width of the annular space, and in which the outer surface of the first ring is sufficienty smooth to slide freely along the inner surface of the first section;

a second bearing in the shape of a second ring which is affixed around the outer surface of the second section at a predetermined distance from the first bearing, in which the thickness of the second ring is slightly less than the width of the annular space, and in which the outer surface of the second ring is sufficiently smooth to slide freely along the inner surface of the first section;

a third bearing in the shape of a third ring which is affixed to the inner surface within the first section adjacent the one end of the first section, in which the thickness of the third ring is slightly less than the width of the annular space, and in which the inner surface of the third ring is sufficiently smooth to slide freely along the outer surface of the second section; and a resilient seal formed in the shape of a seal ring having a generally V-shaped cross-section, where the outside surface of one leg of the V forms the inner surface of the seal ring which is positioned around the outer surface of the second section between the first and second bearings, where the width of the one leg of the V is approximately equal to the predetermined distance, where the open end of the V is oriented toward the first bearing, and where the other leg of the V extends into contact with the inner surface of the first section, whereby pressurized gas flowing through the first section into the second section is prevented from leaking out of the first section by the V-shaped resilient seal ring, which expands to seal the annular space in response to the force generated by the pressurized gas.

3. The conduit of claim 2 in which the pressurized gas is low pressure air used to condition the cabin of the parked aircraft.

4. The conduit of claim 3 in which the pressure of the air is less than one pound per square inch.

* * * * *